US009208819B1

(12) United States Patent
Gregg et al.

(10) Patent No.: US 9,208,819 B1
(45) Date of Patent: Dec. 8, 2015

(54) DYNAMIC SPLIT-FRAME PREVIEW OF VIDEO EDITING EFFECTS

(75) Inventors: John Gregg, San Francisco, CA (US); Sam Kvaalen, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/527,944

(22) Filed: Jun. 20, 2012

(51) Int. Cl.
*G11B 27/031* (2006.01)
*G11B 27/34* (2006.01)

(52) U.S. Cl.
CPC .............. *G11B 27/031* (2013.01); *G11B 27/34* (2013.01); *G11B 2220/90* (2013.01)

(58) Field of Classification Search
CPC .................. G11B 27/034; G11B 2020/10537; G11B 2020/00072; H04N 5/85; H04N 9/8042; H04N 19/00127; H04N 19/0083
USPC .................................. 386/278–290; 715/723
See application file for complete search history.

(56) References Cited

U.S. PATENT DOCUMENTS

| | | | | |
|---|---|---|---|---|
| 5,237,648 A * | 8/1993 | Mills et al. | | 715/723 |
| 6,081,611 A * | 6/2000 | Linford et al. | | 382/128 |
| 6,414,686 B1 * | 7/2002 | Protheroe et al. | | 345/474 |
| 6,621,503 B1 * | 9/2003 | Ubillos | | 715/723 |
| 6,670,966 B1 * | 12/2003 | Kusanagi | | 715/723 |
| 7,287,226 B2 * | 10/2007 | Maymudes et al. | | 715/726 |
| 7,559,017 B2 | 7/2009 | Datar et al. | | |
| 7,716,376 B1 | 5/2010 | Price et al. | | |
| 7,739,599 B2 * | 6/2010 | Patten et al. | | 715/723 |
| 7,769,270 B2 * | 8/2010 | Nakamura et al. | | 386/280 |
| 7,769,819 B2 | 8/2010 | Lerman et al. | | |
| 7,788,585 B2 * | 8/2010 | Ubillos | | 715/723 |
| 7,974,485 B1 * | 7/2011 | Azar et al. | | 382/254 |
| 7,992,183 B1 | 8/2011 | Harrenstien | | |
| 8,032,649 B2 | 10/2011 | Gupta et al. | | |
| 8,898,316 B2 | 11/2014 | Facemire et al. | | |
| 2002/0048413 A1 * | 4/2002 | Kusunoki | | 382/282 |
| 2002/0097258 A1 * | 7/2002 | Maymudes et al. | | 345/723 |
| 2005/0025454 A1 * | 2/2005 | Nakamura et al. | | 386/52 |
| 2005/0039197 A1 | 2/2005 | Ahmad et al. | | |
| 2006/0277470 A1 * | 12/2006 | Schneider et al. | | 715/719 |
| 2007/0183741 A1 | 8/2007 | Lerman et al. | | |
| 2007/0189708 A1 | 8/2007 | Lerman et al. | | |
| 2008/0072261 A1 * | 3/2008 | Ralston et al. | | 725/62 |
| 2008/0072271 A1 | 3/2008 | Wilson et al. | | |
| 2009/0142030 A1 * | 6/2009 | Lee et al. | | 386/52 |
| 2010/0119177 A1 * | 5/2010 | Suzuki | | 382/307 |
| 2010/0260468 A1 * | 10/2010 | Khatib et al. | | 386/52 |

(Continued)

OTHER PUBLICATIONS

U.S. Appl. No. 13/351,922, filed Jan. 17, 2012, entitled, "Online Video Enhancement," 22 pages.
Office Action for U.S. Appl. No. 13/351,922, dated Feb. 14, 2014, 23 pages.

(Continued)

*Primary Examiner* — Gelek W Topgyal
(74) *Attorney, Agent, or Firm* — Fenwick & West LLP

(57) ABSTRACT

This disclosure relates to dynamic split-frame preview of video editing effects. An editing component determines a set of editing effects for the video, generates a copy of the video, applies the set of editing effects to the copy, and provides the video and the copy to a rendering component. The rendering component generates a mask based on a set of mask criteria, renders a split-frame composite video using the video and the edited video based at least in part on the mask, and provides playback of the split-frame composite video. The split-frame composite video provides a dynamic split-frame preview of video editing effects, wherein one frame includes the video, and another frame includes the edited copy of the video.

22 Claims, 13 Drawing Sheets

(56) References Cited

U.S. PATENT DOCUMENTS

| | | | |
|---|---|---|---|
| 2010/0263012 A1 | 10/2010 | Huang et al. | |
| 2011/0067050 A1 | 3/2011 | Samboursky | |
| 2011/0116767 A1* | 5/2011 | Souchard | 386/278 |
| 2011/0314496 A1 | 12/2011 | Di Mattia et al. | |
| 2012/0026519 A1* | 2/2012 | Yoshida | 358/1.11 |
| 2012/0328265 A1* | 12/2012 | Sakuragi et al. | 386/278 |
| 2014/0033042 A1* | 1/2014 | Khatib et al. | 715/723 |

OTHER PUBLICATIONS

Office Action for U.S. Appl. No. 13/351,922, dated Jul. 23, 2014, 28 pages.

Notice of Allowance for U.S. Appl. No. 13/351,922, dated Jan. 12, 2015, 23 pages.

Kang, et al., "Image and Video Abstraction by Coherence-Enhancing Filtering," Eurographics, Feb. 2011, http://www.cs.jhu.edu/~misha/ReadingSeminar/Papers/Kyprianidis11.pdf.

* cited by examiner

DYNAMIC SPLIT-FRAME PREVIEW OF VIDEO EDITING EFFECTS

TECHNICAL FIELD

This disclosure generally relates to systems and methods that facilitate dynamic split-frame preview of video editing effects.

BACKGROUND

The internet and media enabled portable computing devices have dramatically altered the processes for generating and consuming media content. Presently, users can consume media content virtually anywhere at any time, as long as they have access to a media capable device with an internet connection. The convenience of being able to view media content via the internet, essentially on demand, has resulted in explosive growth of internet media consumption. Internet media traffic is currently approaching a majority of consumer internet traffic, and the rate of demand is projected to continue increasing.

Hundreds of millions of people around the world have the capability to create and share content, including videos, music, and blogs. A large number of online services exist to host the ever-growing volume of user-generated content. Popular online services can receive tens of hours worth of newly uploaded content every minute. Users uploading videos to an online service may often desire to apply editing effects in order to enhance the video quality and/or overall production value. However, applying visual changes can be difficult and time consuming. Typically, video editing requires special software, and is typically fairly complex. In addition, it can be difficult for a user to visualize or appreciate an impact of visual changes to a video created by applying editing effects.

A technique that has been commonly employed to assist users visualize or appreciate instances of video editing effects includes displaying a version of a video before application of editing effects, and a version of the video after application of editing effects. Additionally, the before and after videos may be shown simultaneously. However, visualizing or appreciating an impact of a video editing effect may still be challenging, because the user is typically required to continually scan the before and after videos in an effort to appreciate differences that are often very subtle.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for dynamic split-frame preview of video editing effects are disclosed. An editing component determines a set of editing effects for the video, generates a copy of the video, applies the set of editing effects to the copy, and provides the video and the copy to a rendering component. The rendering component generates a mask based on a set of mask criteria, renders a split-frame composite video using the video and the edited video based at least in part on the mask, and provides playback of the split-frame composite video. The split-frame composite video provides a dynamic split-frame preview of video editing effects, wherein one frame includes the video, and another frame includes the edited copy of the video.

In an embodiment, an acquisition component receives a video, a determination component determines a set of editing effects for the video, an effects component generates a copy of the video, and applies the set of editing effects to the copy, and an access component provides a user access to the video and the copy.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
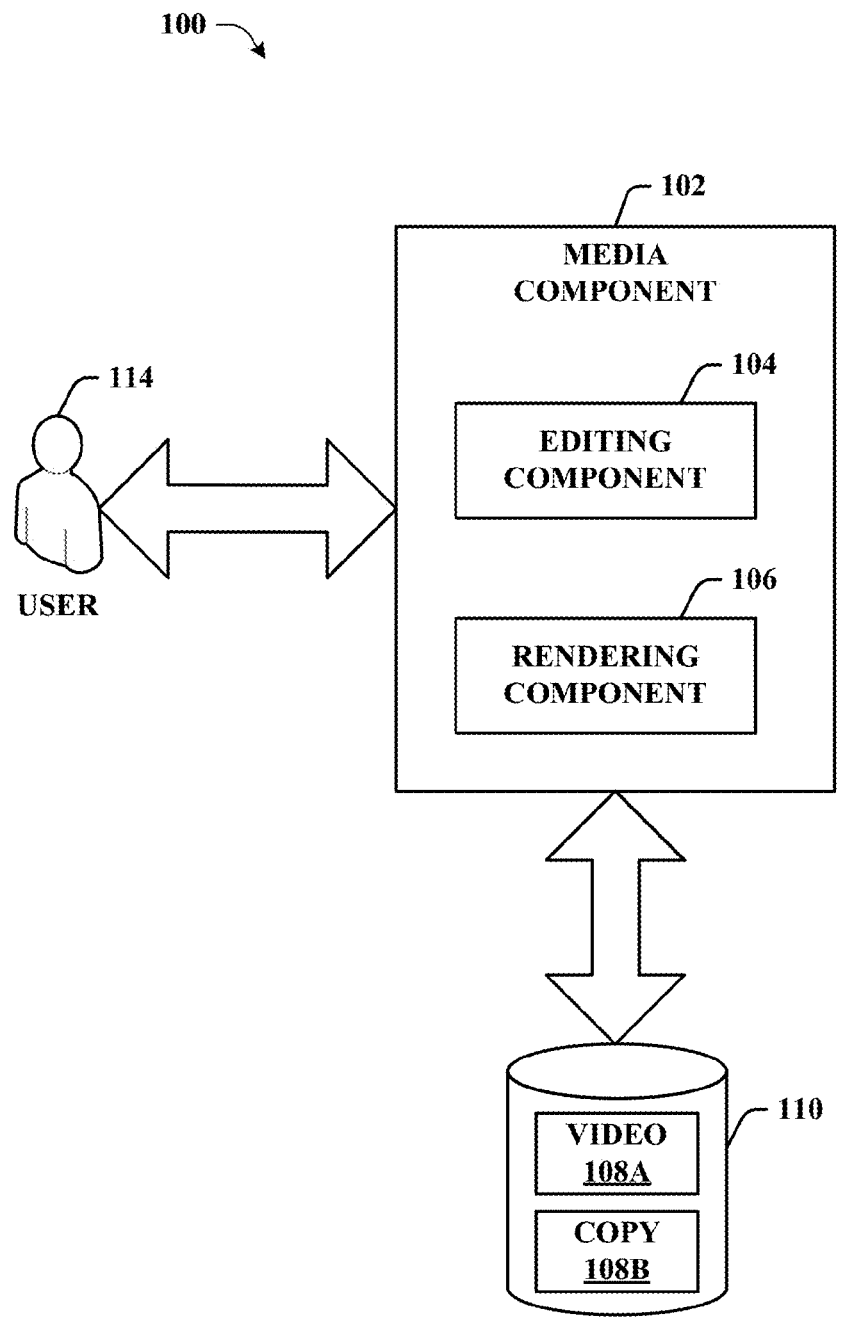
FIG. 1 illustrates an example system for dynamic split-frame preview of video editing effects in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can optout of providing personal information, demographic information, location information, proprietary information, sensitive information, or the like in connection with data gathering aspects. Moreover, one or more implementations described herein can provide for anonymizing collected, received, or transmitted data.

Visualizing or appreciating instances of video editing effects using techniques that display a version of a video before application of editing effects, and a version of the video after application of the editing effects can be challenging. Typically, the user is required to continually scan the before and after videos in an effort to appreciate differences that can be very subtle. One non-limiting implementation of this disclosure provides for accurate and efficient dynamic split-frame preview of video editing effects. More particularly, in accordance with an embodiment, a reception component receives a video and an edited copy of the video, and a composite component generates a split-frame composite video using the video and the edited copy.

Non-Limiting Examples of Systems for Dynamic Split-Frame Preview of Video Editing Effects Turning now to FIG. 1, illustrated is an example system 100 for dynamic split-frame preview of video editing effects in accordance with various aspects described in this disclosure. Generally, system 100 can include a memory that stores computer executable components and a processor that executes computer executable components stored in the memory, examples of which can be found with reference to FIG. 13. System 100 includes a media component 102. The media component 102 generates dynamic split-frame previews of video effects. The media component 102 includes an editing component 104, and a rendering component 106.

The editing component 104 obtains, acquires, or otherwise receives a video 108A. For example, in one implementation, the video 108A can be maintained in a data store 110. The data store 110 can be included in, or associated with a user device and/or a media server (discussed in greater detail with reference to FIGS. 4-5). The editing component 104 generates a copy of the video 108A, and applies a set of editing effects to the copy (edited copy 108B or copy 108B). For instance, the editing component 104 can apply video stabilization to the copy of the video.

The rendering component 106 generates a split-frame composite video (composite video) using the video 108A and the edited copy 108B. Each frame of the composite video includes a first portion and a second portion. The first portion includes a corresponding portion of a corresponding frame in the video 108A, and the second portion includes a corresponding portion of a corresponding frame in the edited copy 108B. For instance, a first frame in the composite video can include a left one fourth (¼) of a first frame in the video 108A (e.g., the first portion), and a right three fourths (¾) of a first frame in the edited copy 108B (e.g., the second portion) (discussed in greater detail with reference to FIGS. 6-8). A user 114 can set, control, or otherwise determine a size, a shape, and/or a location of the first portion and/or the second portion of the composite video.

It is to be appreciated that although the media component 102 is illustrated as being a stand-alone component, such implementation is not so limited. For example, the media component 102 can be included in the user device, a content server, a cloud, and/or a media player. In addition, it is to be appreciated that although the video 108A and edited copy 108B are illustrated as being maintained in the data store 110, such implementation is not so limited. For example, the video 108A and/or edited copy 108B can be maintained in a user device, a media server, and/or another location, wherein the media component 102 accesses the video 108A and/or edited copy 108B using, e.g., a network connection. Furthermore, it is to be appreciated that although the editing component 104 and rendering component 106 are illustrated as being included in the media component 102, such implementation is not so limited. For example, the editing component 104 and rendering component 106 can be included in a user device (discussed in greater detail with reference to FIG. 4). As an additional or alternative example, the rendering component 106 can be included in a user device, and the editing component 104 can be included in a cloud, a server, and/or another location, wherein the rendering component 106 and editing component 104 communicate, for example, using a network connection (discussed in greater detail with reference to FIG. 5).

Figure 2:
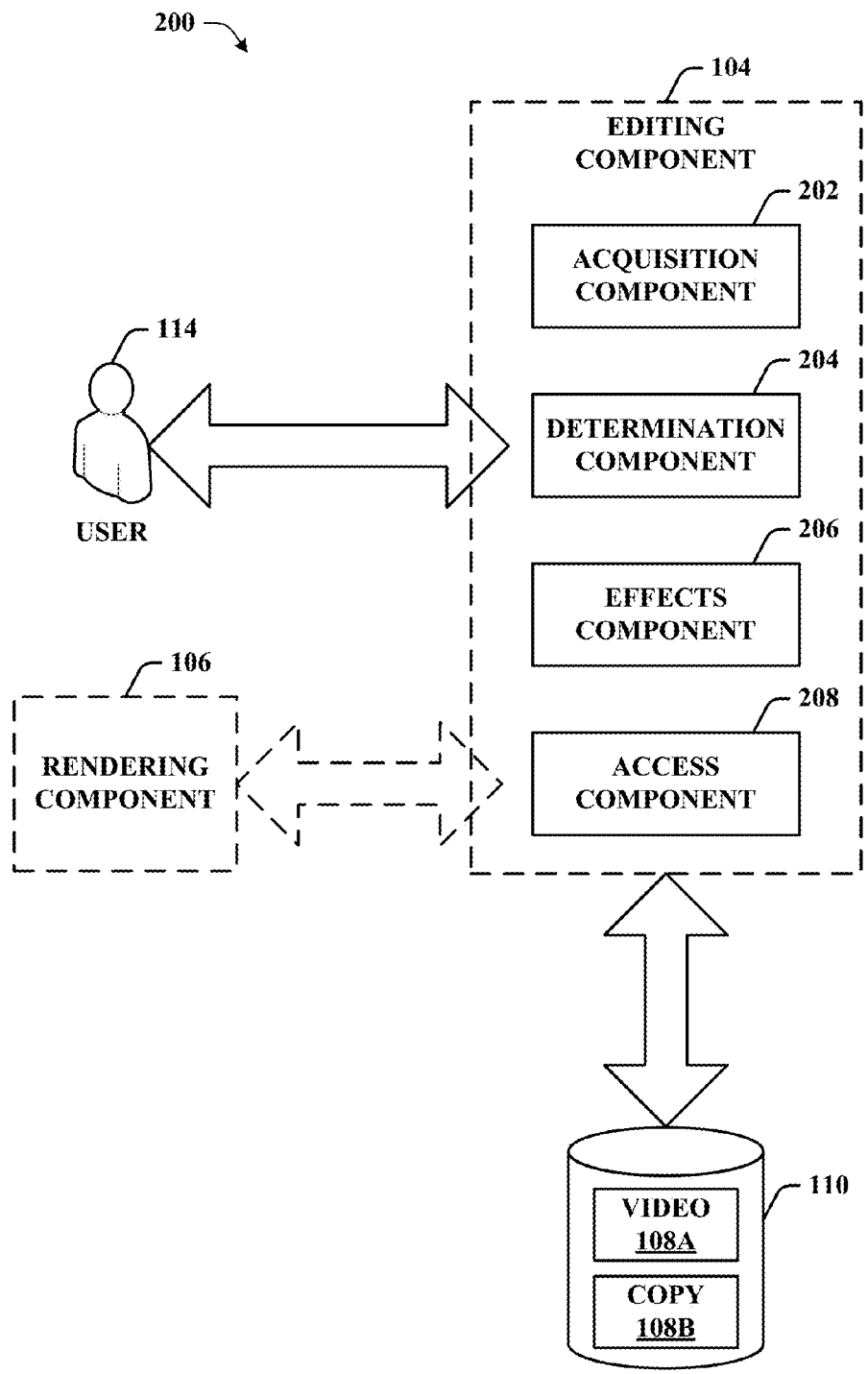
FIG. 2 illustrates an example editing component in accordance with various aspects described in this disclosure.

Referring to FIG. 2, illustrated is an example editing component 104 in accordance with various aspects described in this disclosure. As discussed, the editing component 104 (e.g., video editor) generates a copy of a video 108A, and applies a set of editing effects to the copy (edited copy 108B or copy 108B). The editing component 104 in FIG. 2 includes an acquisition component 202, a determination component 204, an effects component 206, and an access component 208. The acquisition component 202 acquires, obtains, or otherwise receives the video 108A. For example, in one implementation, the acquisition component 202 receives the video from a data store 110. As an additional or alternative example, in one implementation, the acquisition component 202 receives the video from a user 114 (or device associated with the user 114), e.g., using a network connection.

The determination component 204 determines a set of editing effects to apply to the video 108A. The set of editing effects can include but are not limited to video stabilization, auto-leveling (e.g., optimal color correcting and/or contrast stretching), and/or noise removal. For example, in one implementation, the determination component 204 receives the set of editing effects from a user 114 (or a device associated with the user 114). As an additional or alternative example, in one implementation, the determination component 204 analyzes the video, and based on the analysis determines the set of editing effects to apply to the video 108A. For instance, the determination component 204 can analyze the video 108A, and determine an amount of visual noise in the video 108A. If the amount of visual noise in the video 108A satisfies a predetermined threshold, then the determination component 204 can determine to apply noise removal for the video 108A.

The effects component 206 generates a copy of the video 108A, and applies the set of editing effects to the copy (edited copy 108B or copy 108B). For instance, if the set of effects includes auto-leveling, then the effects component 206 can analyze the video 108A (and/or the copy), and color correct the edited copy 108B in a per time segment manner. Aspects of the invention are not limited by a quantity or type of editing effects the effects component 206 can apply to the edited copy 108B. For instance, the effects component 206 can apply virtually any visual effect to the edited copy 108B.

The access component 208 sends, transmits, or otherwise provides the video 108A and the edited copy 108B to the rendering component 106. For example, in one implementation, the access component 208 streams the video 108A and the edited copy 108B to the rendering component 106, e.g., using a network connection. As an additional or alternative example, in one implementation, the access component 208 maintains the video 108A and the edited copy 108B in the data store 110, and the rendering component 106 accesses the video 108A and the edited copy 108B from the data store 110. For instance, the access component 208 can provide a notification (e.g., message, flag, bit, etc.) to the rendering component 106 indicating the availability of the video 108A and/or the edited copy 108B in the data store 110.

Figure 3:
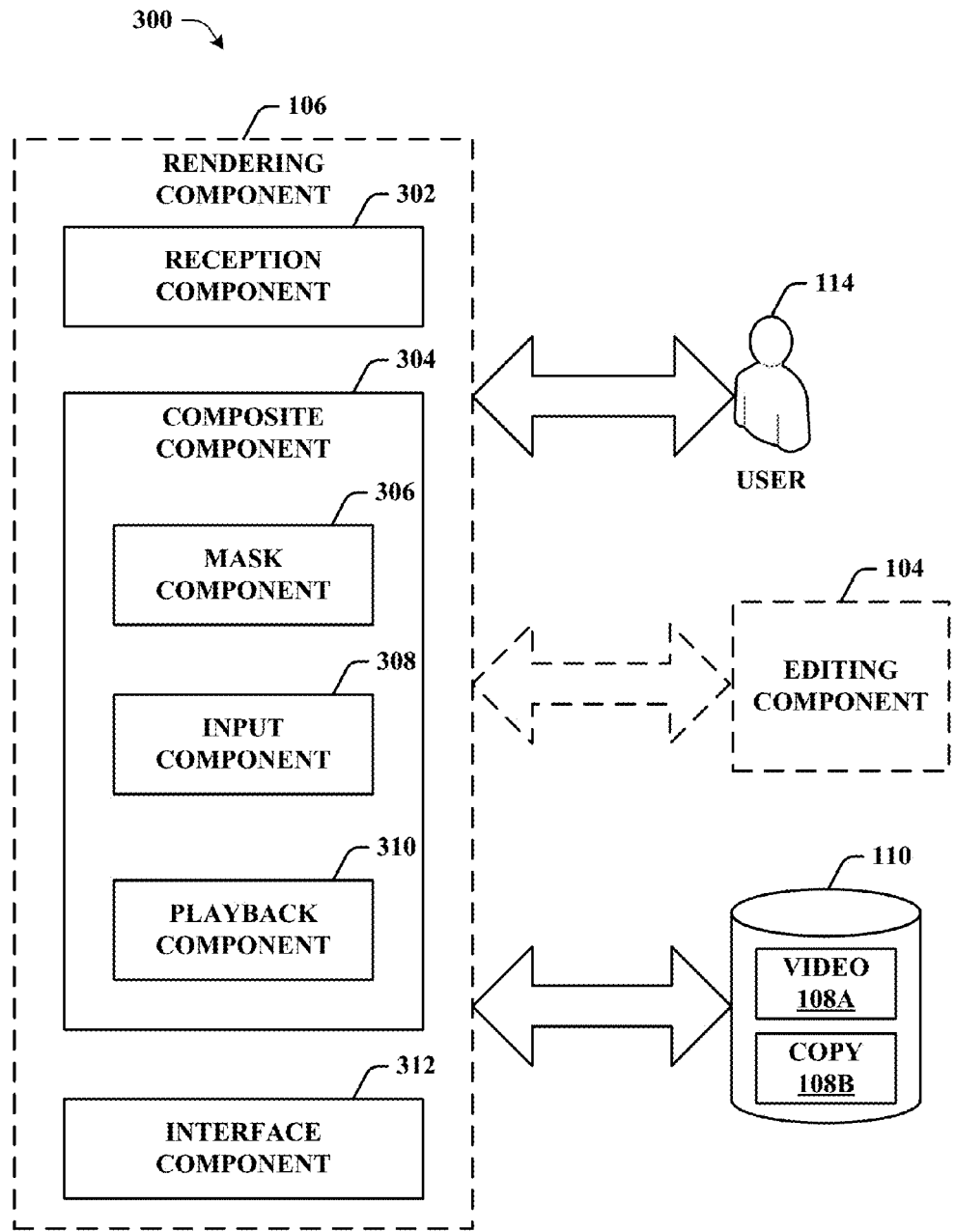
FIG. 3 illustrates an example rendering component in accordance with various aspects described in this disclosure.

FIG. 3 illustrates an example rendering component 106 in accordance with various aspects described in this disclosure. As discussed, the rendering component 106 generates a split-frame composite video (composite video) using a video 108A and an edited copy 108B. The rendering component 106 in FIG. 3 includes a reception component 302, a composite component 304, and an interface component 312.

The reception component 302 acquires, obtains, or otherwise receives the video 108A and the edited copy 108B. For example, in one implementation, an editing component 104 streams the video 108A and the edited copy 108B to the rendering component 106. As an additional or alternative example, in one implementation, the reception component 302 obtains the video 108A and the edited copy 108B from a data store 110.

The composite component 304 generates a split-frame composite video (composite video) using the video 108A and the edited copy 108B. Each frame of the composite video includes a first portion and a second portion. The first portion includes a corresponding portion of a corresponding frame in the video 108A, and the second portion includes a corresponding portion of a corresponding frame in the edited copy 108B. The composite component includes a mask component 306, an input component 308, and a playback component 310.

The mask component 306 generates a mask based on a set of mask criteria, and applies the mask to the video 108A and/or the edited copy 108B. The mask defines an area (masked area) of the composite video that includes, displays, or otherwise contains applied editing effects (e.g., edited copy 108B). The set of mask criteria can include but is not limited to a size, a location, and/or a shape of the mask. For example, in one implementation, a first portion of each frame in the composite video, includes a portion corresponding to an area of a corresponding frame in the video 108A not included in the masked area, and a second portion of each frame in the composite video, includes a portion corresponding to an area of a corresponding frame in the edited copy 108B included in the masked area. The composite video provides a split-frame preview of editing effects applied to the edited copy 108B against the original video 108A. For instance, if the mask is a rectangle including a right half of a frame area, then a first frame in the composite video can include a left half (½) of a first frame in the video 108A (e.g., the first portion), and a right half (½) of a first frame in the edited copy 108B (e.g., the second portion) (discussed in greater detail with reference to FIGS. 6-8).

The input component 308 acquires, obtains, or otherwise receives a subset of the mask criteria from a user 114. For example, the user 114 can input the size, the location, and/or the shape of the mask using the input component 308. The inputs can include explicit user inputs (e.g., configuration selections, question/answer) such as from mouse selections, keyboard selections, speech, and so forth. The inputs can also include data uploads, wherein a data upload is the transfer of data from the user 114 or a third party source (e.g. computer or a computer readable medium), to the input component 308.

The playback component 310 executes, plays, or otherwise provides playback of the composite video. For example, in one implementation, the playback component 310 streams the composite video to the user 114 as a single split screen video stream. The split screen video stream can include the video and the edited copy positioned side-by-side (See FIG. 8), and provides for efficient frame synchronization. The playback component 310 can provide a set of playback controls that provide the user 114 to control playback of the composite video. The set of playback controls can include but is not limited to play, pause, stop, rewind, and/or fast forward. In addition, the playback component 310 provides a set of mask adjustment controls that provide for the user 114 to adjust a subset of the mask criteria (e.g., using the input component 308) during playback of the composite video. For instance, the user 114 can modify the shape of a mask during playback of the composite video using the mask adjustment controls, the composite video can be updated based on the modified mask (e.g., using the mask component 306), and the playback component 310 can continue playback of the updated composite video without interruption.

The interface component 312 provides various adapters, connectors, channels, communication paths, etc. to integrate the rendering component 106 into virtually any operating and/or database system(s). In addition, the interface component 312 can provide various adapters, connectors, channels, communication paths, etc., that provide for interaction with the rendering component 106, and the media component 102. It is to be appreciated that although the interface component 312 is incorporated into the rendering component 106, such implementation is not so limited. For instance, the interface component 312 can be a stand-alone component to receive or transmit data in relation to the rendering component 106.

Figure 4:
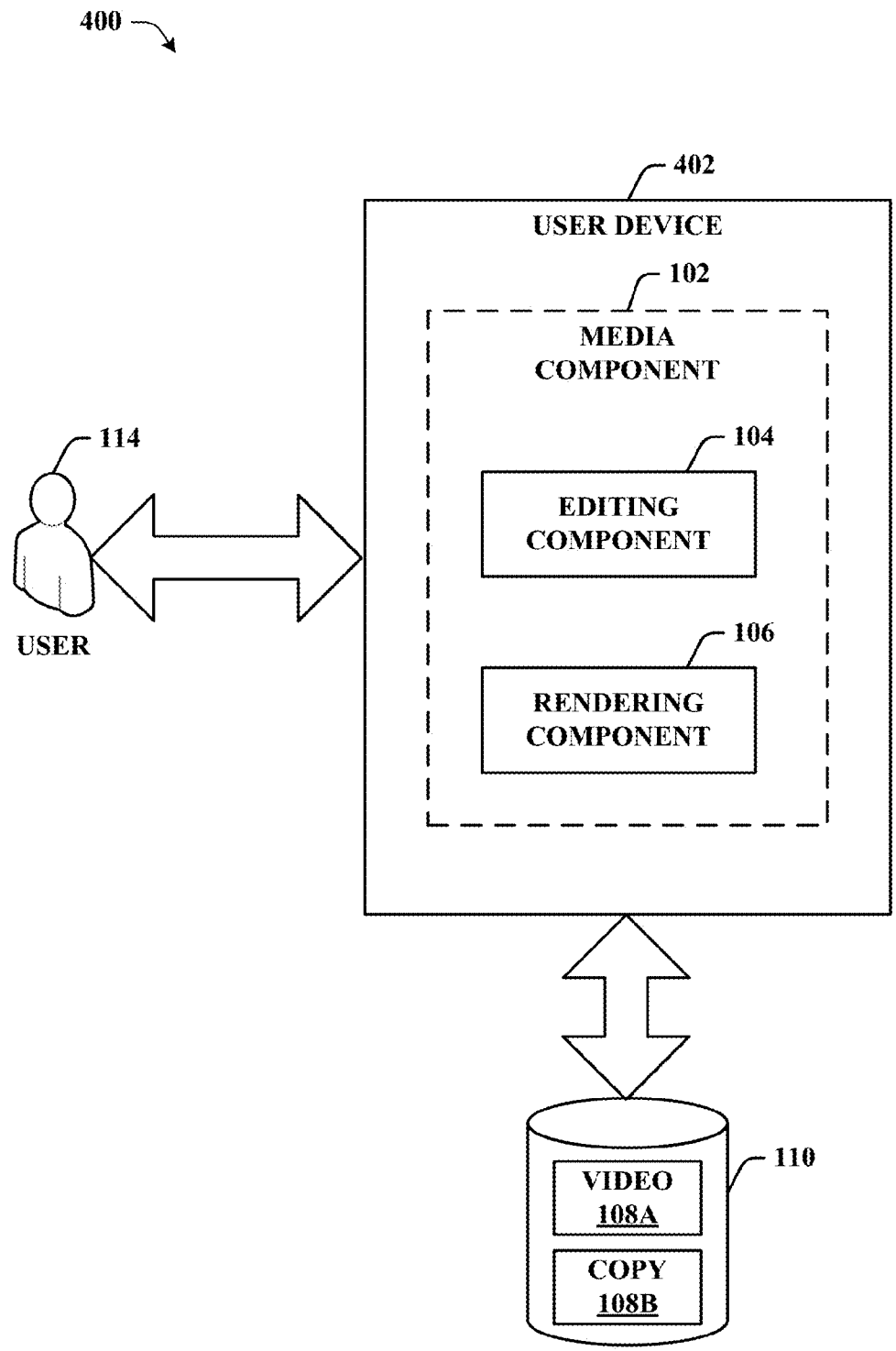
FIG. 4 illustrates an example system for dynamic split-frame preview of video editing effects in accordance with various aspects described in this disclosure.

FIG. 4 illustrates an example system 400 for dynamic split-frame preview of video editing effects in accordance with various aspects described in this disclosure. The system 400 includes a user device 402. The user device 402 can include but is not limited to a smart phone, a cell phone, a personal digital assistant (PDA), a tablet, a laptop, a desktop, a portable music player, a video game system, an electronic reader (e-reader), global positioning system (GPS), a set-top box, and/or a television. The user device 402 in FIG. 4 includes a media component 102. As discussed, the media component 102 generates dynamic split-frame previews of video effects. The media component 102 in FIG. 4 includes an editing component 104, and a rendering component 106.

The editing component 104 receives a video 108A. For example, in one implementation, the video 108A can be maintained in a data store 110. The editing component 104 generates a copy of the video 108A, and applies a set of editing effects to the copy (edited copy 108B or copy 108B). The rendering component 106 generates a slit-frame composite video (composite video) using the video 108A and the edited copy 108B. Each frame of the composite video includes a first portion and a second portion. The first portion includes a corresponding portion of a corresponding frame in the video 108A, and the second portion includes a corresponding portion of a corresponding frame in the edited copy 108B. For instance, a first frame in the composite video can include a left one fourth (¼) of a first frame in the video 108A (e.g., the first portion), and a right three fourths (¾) of a first frame in the edited copy 108B (e.g., the second portion) (discussed in greater detail with reference to FIGS. 6-8). A user 114 can set, control, or otherwise determine a size, a shape, and/or a location of the first portion and/or the second portion of the composite video (e.g., a mask).

It is to be appreciated that the split-frame preview of editing effects provided by the media component 102 may enhance video editing capabilities for portable computing devices (e.g., user device 402). Typically, portable computing devices, such as tablets, digital cameras, smart phones, and so forth have smaller screens than laptops, desktops, etc. Traditional video editing techniques that display both a before and after video may require more screen space, in order to be used effectively, than is available on a portable computing device.

By providing a split-frame preview of editing effects in a single window (discussed in greater detail with reference to FIGS. 7-8), the media component 102 can enable video editing using screen sizes available to portable computing devices.

Figure 5:
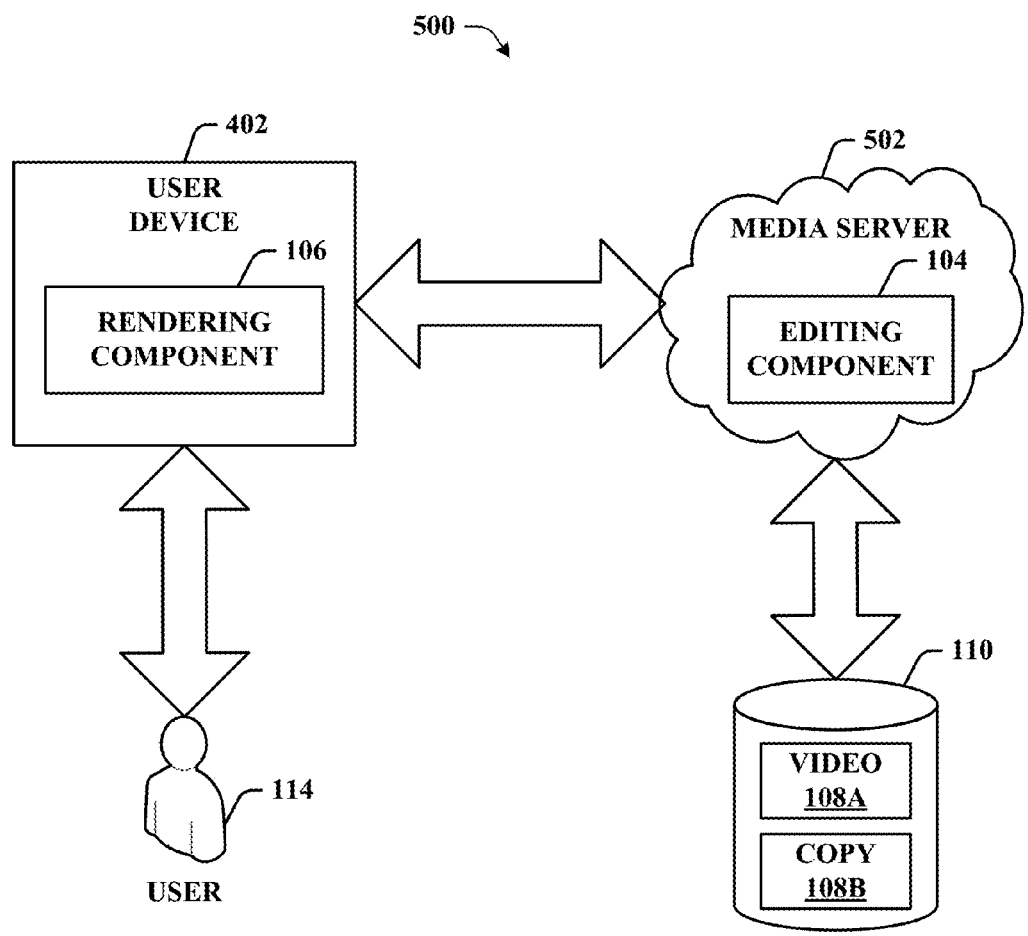
FIG. 5 illustrates an example system for dynamic split-frame preview of video editing effects in accordance with various aspects described in this disclosure.

FIG. 5 illustrates an example system 500 for dynamic split-frame preview of video editing effects in accordance with various aspects described in this disclosure. The system 500 includes a user device 402, and a media server 502. The media server 502 in FIG. 5 includes an editing component 104. As discussed, the editing component 104 receives a video 108A. For example, in one implementation, the video 108A can be uploaded to the media server 502, e.g., from the user device 402, and maintained in a data store 110 associated with the media server 502. The editing component 104 generates a copy of the video 108A, and applies a set of editing effects to the copy (edited copy 108B or copy 108B). The editing component 104 streams the video 108A and the edited copy 108B to the user device 402, e.g., using a network connection.

As discussed, the user device 402 can include but is not limited to a smart phone, a cell phone, a personal digital assistant (PDA), a tablet, a laptop, a desktop, a portable music player, a video game system, an electronic reader (e-reader), global positioning system (GPS), a set-top box, and/or a television. The user device 402 in FIG. 5 includes a rendering component 106. As discussed, the rendering component 106 generates a split-frame composite video (composite video) using the video 108A and the edited copy 108B. Each frame of the composite video includes a first portion and a second portion. The first portion includes a corresponding portion of a corresponding frame in the video 108A, and the second portion includes a corresponding portion of a corresponding frame in the edited copy 108B. For instance, a first frame in the composite video can include a left one fourth (¼) of a first frame in the video 108A (e.g., the first portion), and a right three fourths (¾) of a first frame in the edited copy 108B (e.g., the second portion) (discussed in greater detail with reference to FIGS. 6-8). A user 114 can set, control, or otherwise determine a size, a shape, and/or a location of the first portion and/or the second portion of the composite video (e.g., a mask).

Figure 6:
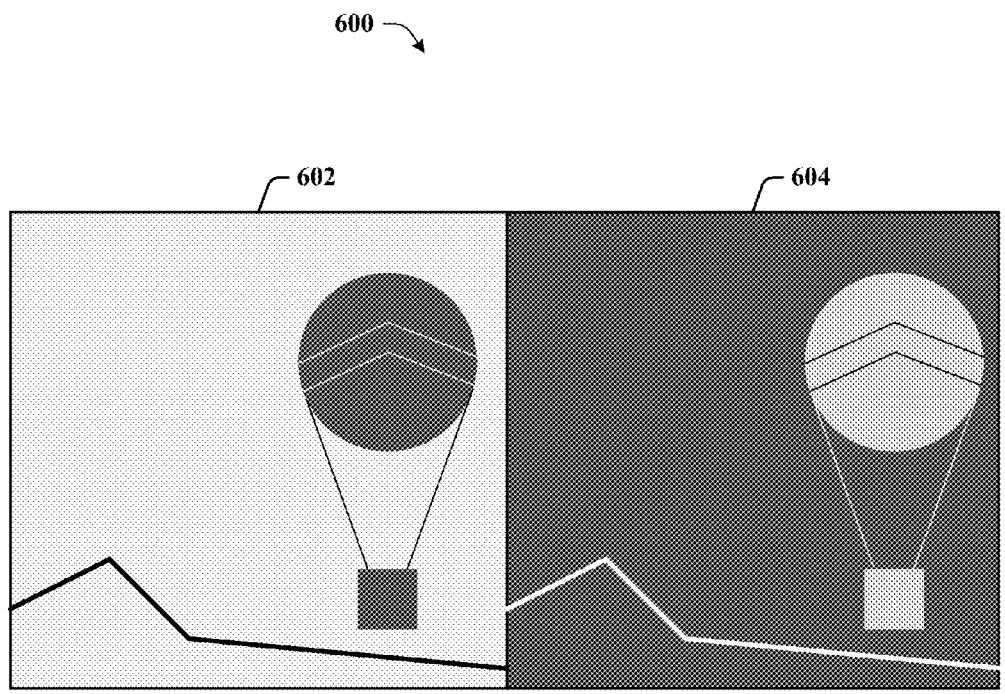
FIG. 6 illustrates a system that provides a non-limiting example of an editing effect in accordance with various aspects described in this disclosure.

Referring to FIG. 6, illustrated is a system 600 that provides a non-limiting example of an editing effect in accordance with various aspects described in this disclosure. The system 600 includes a first frame 602 of a video (e.g., video 108A), and a first frame 604 of a copy of the video (e.g., video 108A) having a set of editing effects applied (e.g., edited copy 108B or copy 108B). As discussed, a set of editing effects to be applied to the copy can be determined by a user (e.g., user 114), or dynamically determined based on an analysis of the video (e.g., using the determination component 204). The first frame 604 is a color inverted (e.g., edited) copy of the first frame 602 of the video. The color inversion may be applied to each, or a subset of frames, included in the copy of the video. Aspects of the invention are not limited to quantities or types of editing effects. For example, virtually any editing effect can be applied to the copy of the video.

Figure 7:
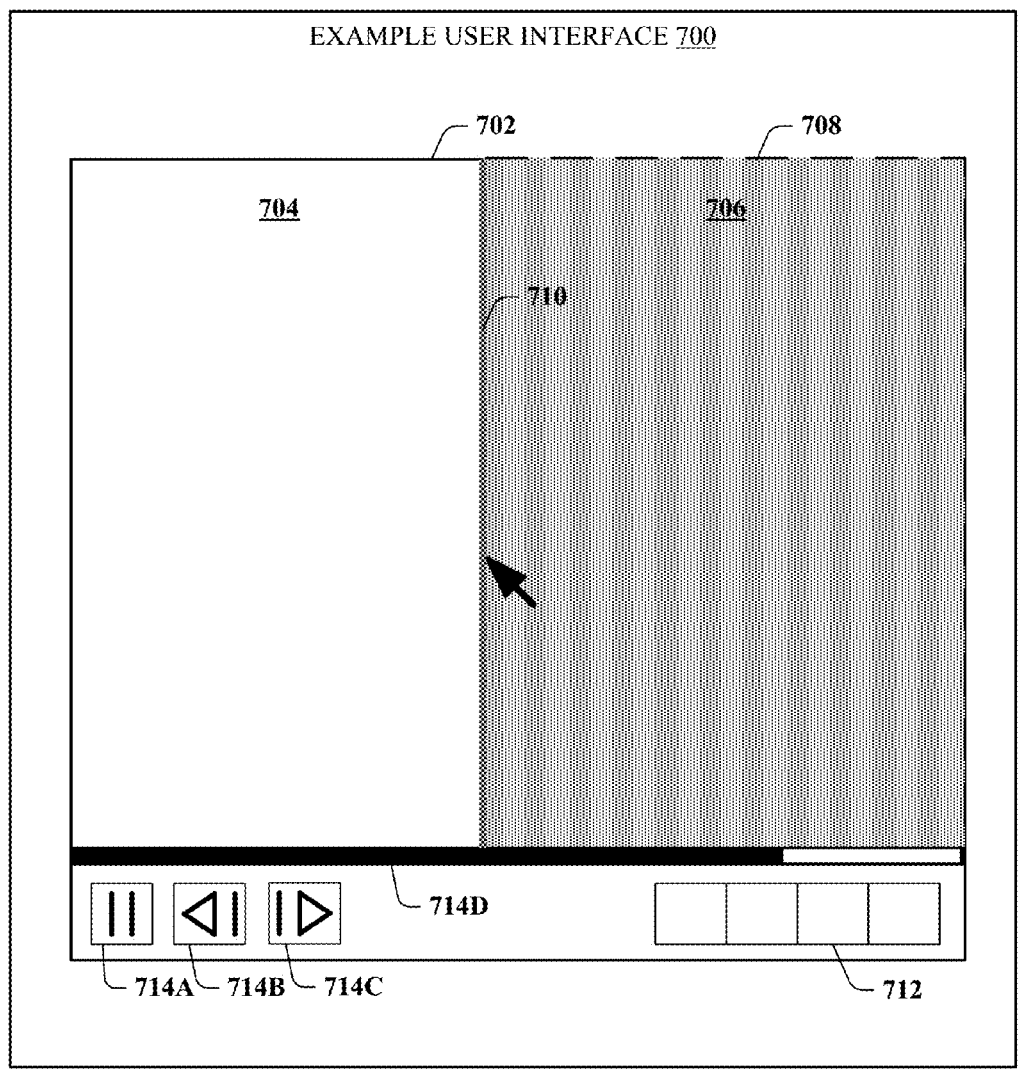
FIG. 7-9 illustrate systems that provide non-limiting examples of user interfaces in accordance with various aspects described in this disclosure.

FIG. 7 illustrates a system that provides a non-limiting example of a user interface 700 in accordance with various aspects described in this disclosure. The user interface 700 includes a dynamic split-frame preview window 702 (window 702). The window 702 executes, displays, or otherwise plays a composite video using a first video (e.g., video 108A), and an edited copy of the first video (e.g., edited copy 108B) (e.g., using the rendering component 106). Each frame of the composite video includes a first portion 704 and a second portion 706. The first portion 704 includes a corresponding portion of a corresponding frame of the first video, and the second portion includes a corresponding portion of a corresponding frame of the edited copy.

As discussed, a user (e.g., user 114) can set, control, or otherwise determine a size, a shape, and/or a location of the first portion and/or the second portion of the composite video. For example, in one implementation, the user can control a mask 708 that defines the size, the shape, and/or the location of the second portion 706. For instance, the user can move, drag, or otherwise modify a location of a mask indicator 710 (e.g., boundary, divider, edge, etc.) to control a first size of the mask 708. As an additional or alternative example, the window 702 can include a set of mask adjustment controls 712. The set of mask adjustment controls 712 can include but are not limited to a set of mask shapes, and/or a set of mask coordinates that enable modifying the location of the mask 708. In addition, the window 702 includes a set of playback controls 714 (e.g., 714A-D) that provide for the user to control playback of the composite video (e.g., split screen preview). The set of playback controls 714 can include but is not limited to a play button 714A, a skip forward button 714B, a skip reverse button 714C, and/or a video seek bar 714D (e.g., time lapse bar, etc.).

Figure 8:
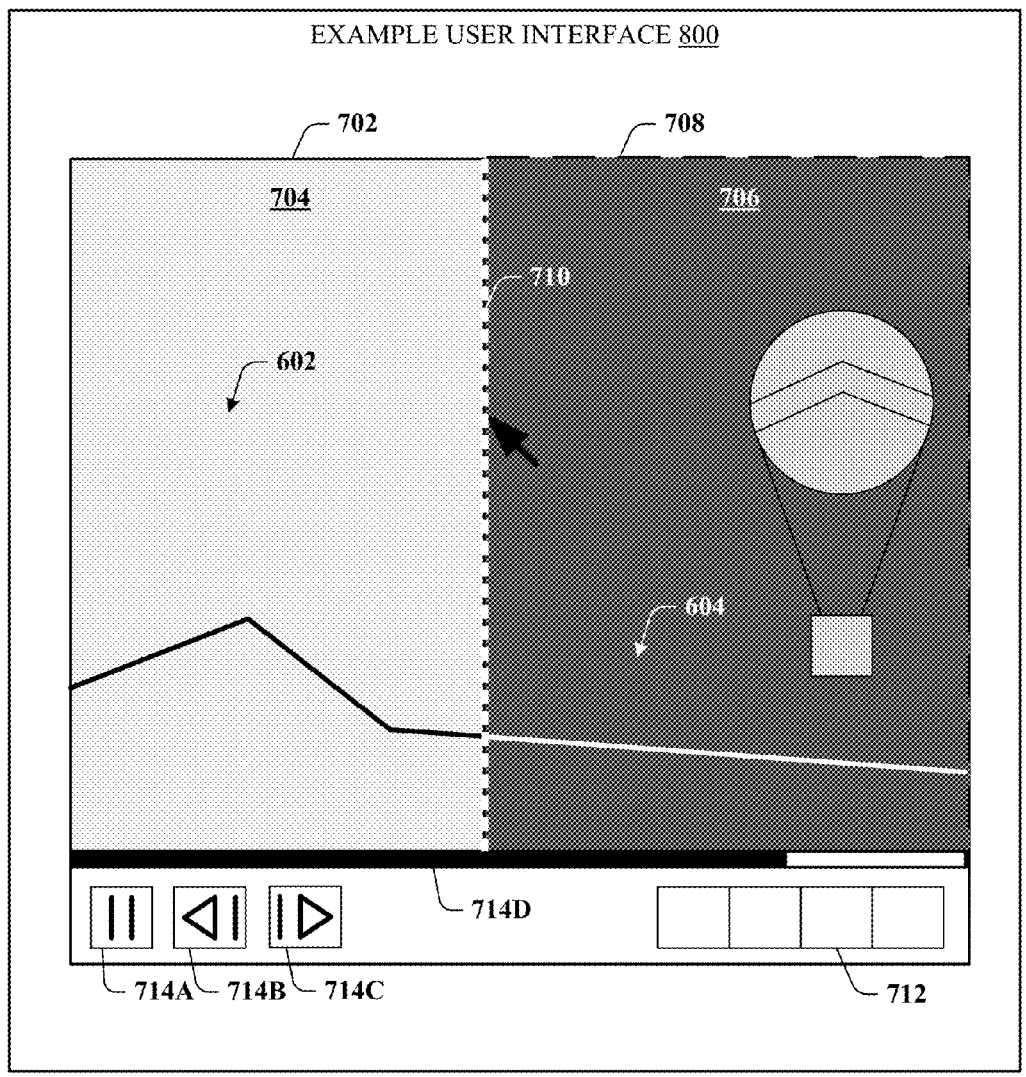

FIG. 8 illustrates a system that provides a non-limiting example of a user interface 800 in accordance with various aspects described in this disclosure. The user interface 800 includes a dynamic split-frame preview window 702 (window 702). The window 702 executes, displays, or otherwise plays a split-frame composite video (composite video) using a first video (e.g., video 108A), and an edited copy of the first video (e.g., edited copy 108B). Each frame of the composite video includes a first portion 704 and a second portion 706. The first portion 704 includes a corresponding portion of a corresponding frame in the first video, and the second portion 706 includes a corresponding portion of a corresponding frame in the edited copy of the first video. For instance, a first frame of the composite video can include a portion of a first frame 602 of a video corresponding to the first portion 704, and a portion of a first frame 604 of an edited copy of the video corresponding to the second portion 706 (See FIG. 6). It is to be appreciated that the composite video provides a split frame preview of editing effects by displaying an original video (e.g., video 108A), and the edited copy of the original video (e.g., edited copy 108B) in a single window (e.g., window 702). In addition, the indictor 710 distinguishes, delineates, or otherwise separates the original video and the edited copy.

As discussed, a user (e.g., user 114) can set, control, or otherwise determine a size, a shape, and/or a location of the first portion 704 and/or the second portion 706 of the composite video. For example, in one implementation, the user can control a mask 708 that defines the size, the shape, and/or the location of the second portion 706 in the window 702. For instance, the user can move, drag, or otherwise modify a mask indicator 710 (e.g., divider, edge, etc.) to control a first size of the mask 708, for example, using a cursor. As an additional or alternative example, the window 702 can include a set of mask adjustment controls 712. The set of mask adjustment controls 712 can include but are not limited to a set of mask shapes, and/or a set of mask coordinates that enable modifying the location of the mask 708. In addition, the window 702 includes a set of playback controls 714 (e.g., 714A-D) that provide for the user to control playback of the composite video (e.g., split screen preview). The set of playback controls 714 can include but is not limited to a play button 714A, a skip forward button 714B, a skip reverse button 714C, and/or a video seek bar 714D (e.g., time lapse bar, etc.).

Figure 9:
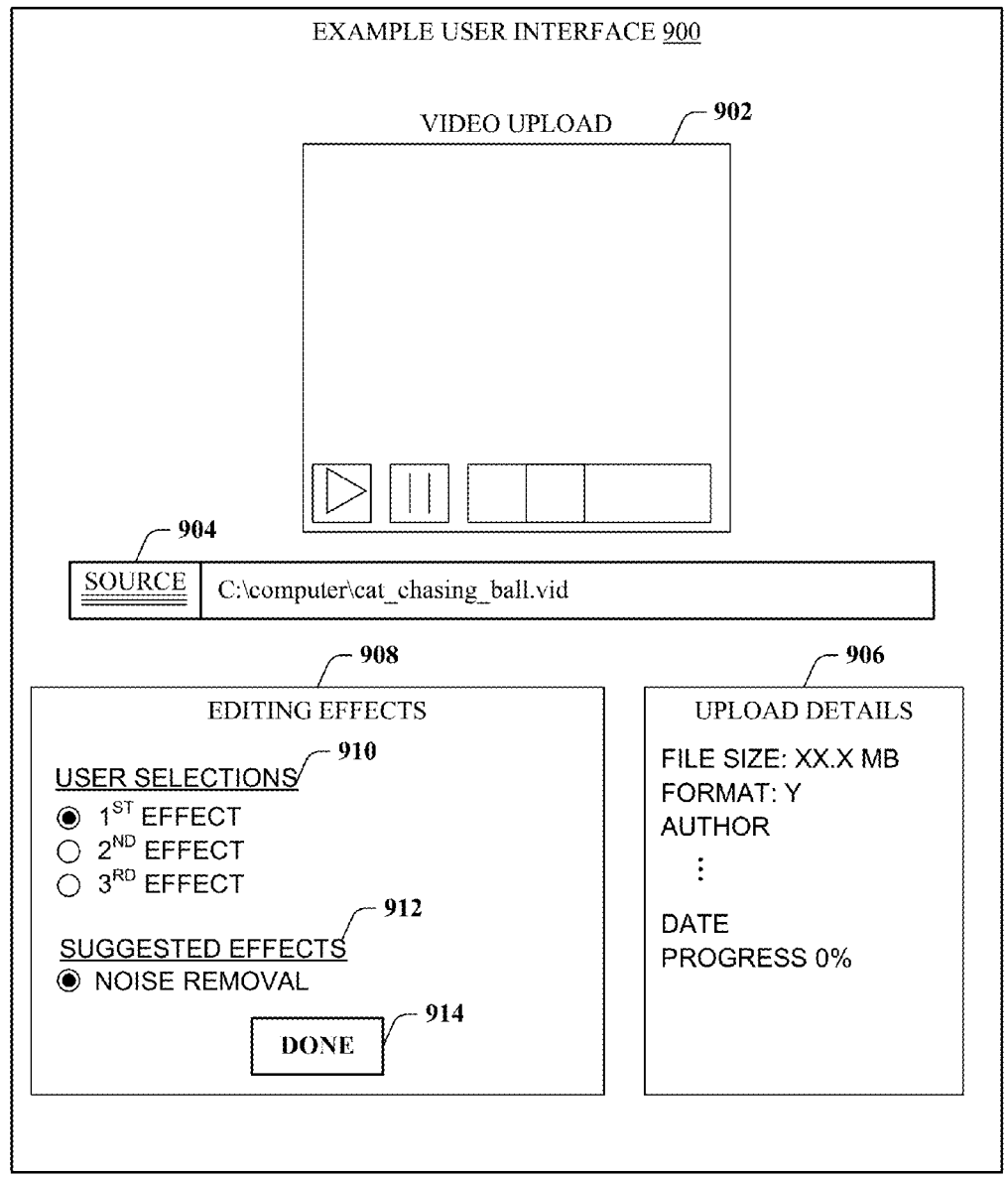

FIG. 9 illustrates a system that provides a non-limiting example of a user interface 900 in accordance with various aspects described in this disclosure. The interface 900 can include a video upload display window 902 that provides for inspection, viewing, or replay of a video upload. As discussed, a video (e.g., video 108A) can be uploaded, for example, to a media server (e.g., media server 502) from a user device (e.g., the user device 402). A user (e.g., user 114) may desire to view a video, prior to uploading, to ensure that it is the correct video, and/or that the video displays as intended. In addition, the user interface 900 can include a file location field 904 that enables the user to locate the video for upload, or enter a source path for the video. The video can be uploaded from, for example a user device, website, or cloud based storage. An upload details section 906 can display virtually any information relating to the video, such as file size, format, metadata, date, upload progress, and so forth, as made available by the content, content owner, and/or uploading user.

The user interface 900 can also include an editing effects section 908 that provides one or more effects for application to the video. For example, the editing effects section 908 can include a set of user selections 910 that provide for the user to determine a set of editing effects for application to the video. Furthermore, the editing effects section 908 can include a set of suggested effects 912 that provide a set of suggested editing effects. As discussed, the video can be analyzed, and a set of editing effects can be determined based on the analysis (e.g., using the determination component 204). For instance, the video can be analyzed, and an amount of visual noise in the video can be determined. If the amount of visual noise satisfies a predetermined threshold, then noise removal can be included in the set of suggested effects 912.

The editing effects section 908 can further include a done button 914 that, when selected, initiates application of the selected editing effects. For instance, upon selection of the done button 914 a copy of the video can be generated, and the selected editing effects can be applied to the copy.

Figure 10:
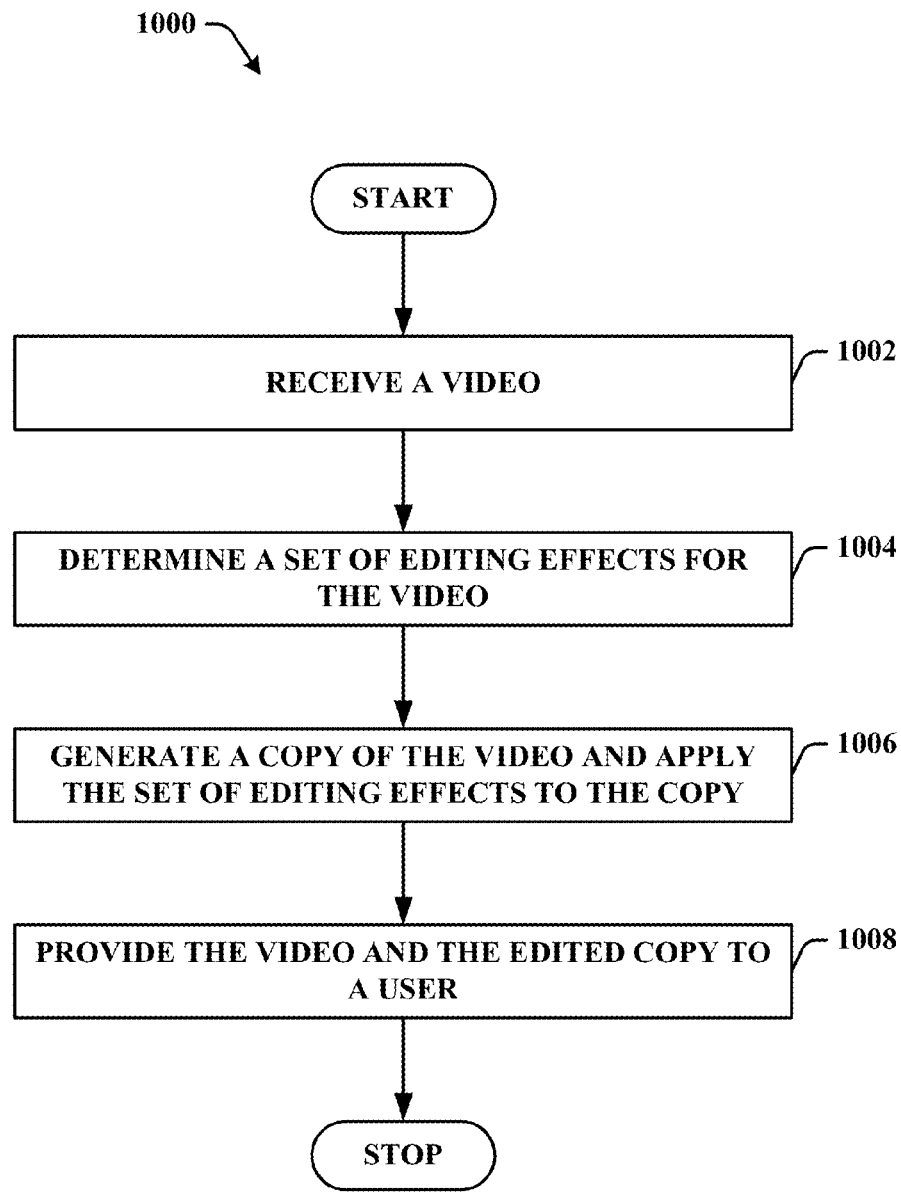
FIGS. 10-11 are example flow diagrams of respective methodologies for dynamic split-frame preview of video editing effects in accordance with various aspects described herein.
Figure 11:
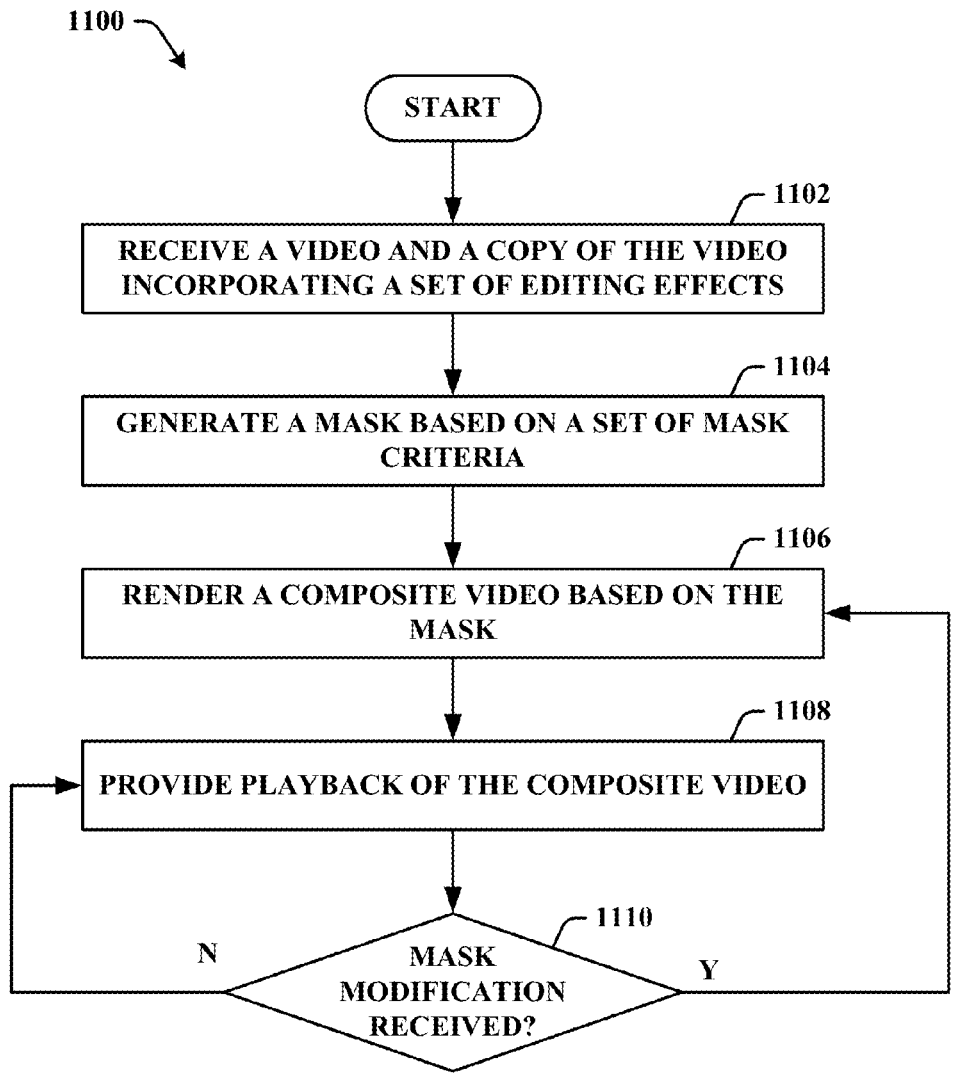

Non-Limiting Examples of Methods for Dynamic Split-Frame Preview of Video Editing Effects FIGS. 10-11 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 10, illustrated is an example methodology 1000 for dynamic split-frame preview of video editing effects in accordance with various aspects described in this disclosure. At reference numeral 1002, a video is acquired, obtained, or otherwise received (e.g., using the editing component 104). For example, in one implementation, the video is uploaded to a media server from a device associated with a user. As an additional or alternative example, in one implementation, the video is obtained from a data store.

At reference numeral 1004, a set of editing effects for the video are determined (e.g., using the determination component 204). The set of editing effects can include but are not limited to video stabilization, auto-leveling (e.g., optimal color correcting and/or contrast stretching), and/or noise removal. For example, in one implementation, the set of editing effects are determined by a user (e.g., user 114). As an additional or alternative example, in one implementation, the video is analyzed, and the set of editing effects are determined based on the analysis (e.g., using the determination component 204). For instance, the video can be analyzed, and an amount of visual noise in the video can be determined. If the amount of visual noise satisfies a predetermined threshold, then the set of editing effects can include noise removal.

At reference numeral 1006, a copy of the video is generated, and the set of editing effects are applied to the copy (e.g., using the effects component 206). For instance, if the set of effects includes auto-leveling, then the copy can be analyzed, and color corrected in a per time segment manner. Aspects of the invention are not limited by a type or quantity of editing effects, and virtually any editing effect can be applied to the copy. At reference numeral 1008, the video and the edited copy are provided to the user (or device associated with the user) (e.g., using the access component 208). For example, in one implementation, the video and the edited copy are streamed to the user, e.g., using a network connection. For instance, the video and the edited copy can be aggregated, joined, or otherwise combined into a single split screen video stream (e.g., split frame composite video). The split screen video stream can include the video and the edited copy positioned side-by-side (See FIG. 8), and provides for efficient frame synchronization. As an additional or alternative example, in one implementation, the video and the edited copy are maintained in a data store, and made available to the user. For instance, a notification (e.g., message, flag, bit, etc.) can be provided indicating the availability of the video and the edited copy in the data store a predetermined amount of time after applying the set of editing effects to the edited copy.

Referring now to FIG. 11, illustrated is an example methodology 1100 for dynamic split-frame preview of video editing effects in accordance with various aspects described in this disclosure. At reference numeral 1102, a video and a copy of the video incorporating a set of editing effects (edited video) are obtained, acquired, or otherwise received (e.g., using the reception component 302). For example, in one implementation, a set of streams including the video and the edited copy are received. As an additional or alternative example, in one implementation, the video and the edited copy are retrieved from a data store. For instance, a notification (e.g., message, flag, bit, etc.) can be received indicating the availability of the video and the edited copy in the data store.

At reference numeral 1104, a mask is determined, set, or otherwise generated based at least in part on a set of mask criteria (e.g., using the mask component 306). The set of mask criteria can include but is not limited to a size, a location, and/or a shape of the mask. At reference numeral 1106, a composite video is rendered based in part on the mask (e.g., using the mask component 306). The mask defines an area of the composite video (masked area) that includes the edited copy. For example, in one implementation, a first portion of each frame of the composite video includes a portion of a corresponding frame in the video outside of the masked area, and a second portion of each frame in the composite video, includes a portion of a corresponding frame in the edited copy inside the masked area. The composite video provides a split-frame preview of editing effects included in the edited copy against the video. For instance, if the mask is a rectangle including a right half of a frame area, then a first frame in the composite video can include a left half (½) of a first frame in the video (e.g., the first portion), and a right half (½) of a first frame in the edited copy (e.g., the second portion) (discussed in greater detail with reference to FIGS. 6-8).

At reference numeral 1108, playback of the composite video is provided (e.g., using the playback component 310). A user can adjust, control, or otherwise manipulate a set of playback controls to direct playback of the composite video. The set of playback controls can include but is not to play, pause, stop, rewind, and/or fast forward. At reference numeral 1110, a determination is made whether a mask modification (e.g., adjustment, move, etc.) has been received (e.g., using the editing component 104). For instance, the user can modify one or more of the mask criteria (e.g., shape, size, or location) during playback of the composite video.

If it is determined that a mask modification has been received (Y at 1110), then the methodology returns to reference numeral 1106, and the rendering of the composite video is updated based on the modified mask during playback (e.g., using the rendering component). For instance, the rendering of the composite video can be updated during playback, and playback of the updated composite video can continue without interruption or stopping. If a mask modification has not been received (N at 1110), then playback of the composite video continues at reference numeral 1108.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
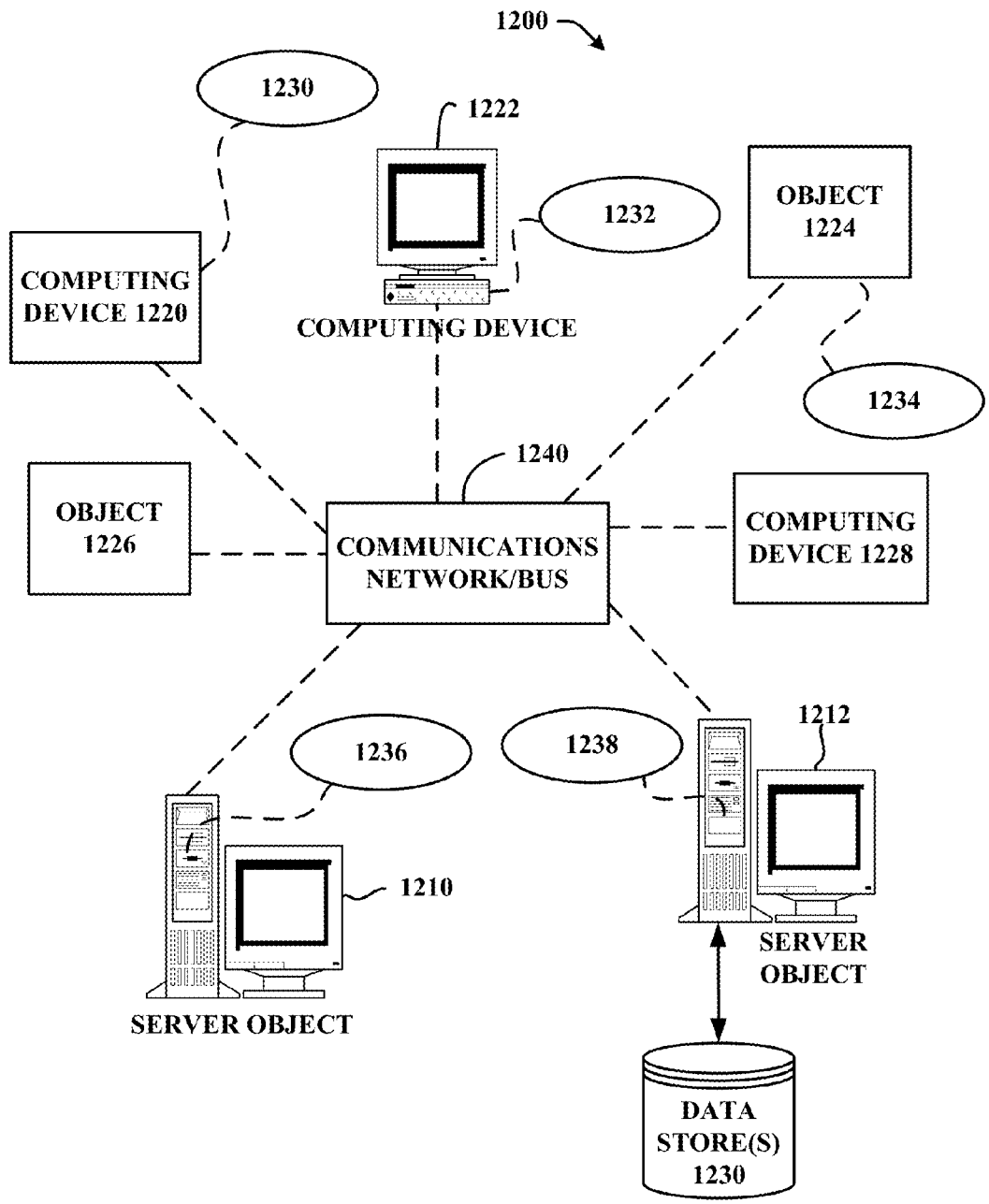
FIG. 12 is a block diagram representing an exemplary non-limiting networked environment in which the various embodiments can be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as personal data assistants (PDAs), audio/video devices, mobile phones, MP3 players, personal computers, tablets, laptops, etc. It is to be appreciated that the distributed computing environment can be used in connection with implementing one or more of the systems or components shown and described in connection with FIGS. 1-5. For instance, the computing device 1222 can include the user device 402, and the server object 1210 or 1212 can include the media server 502.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1240 is the Internet, for example, the computing objects 1210, 1212, etc. can be Web servers with which the client computing objects or devices 1220, 1222, 1224, 1226, 1228, etc. communicate via any of a number of known protocols, such as the hypertext transfer protocol (HTTP). Objects 1210, 1212, etc. may also serve as client computing objects or devices 1220, 1222, 1224, 1226, 1228, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 14 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 13:
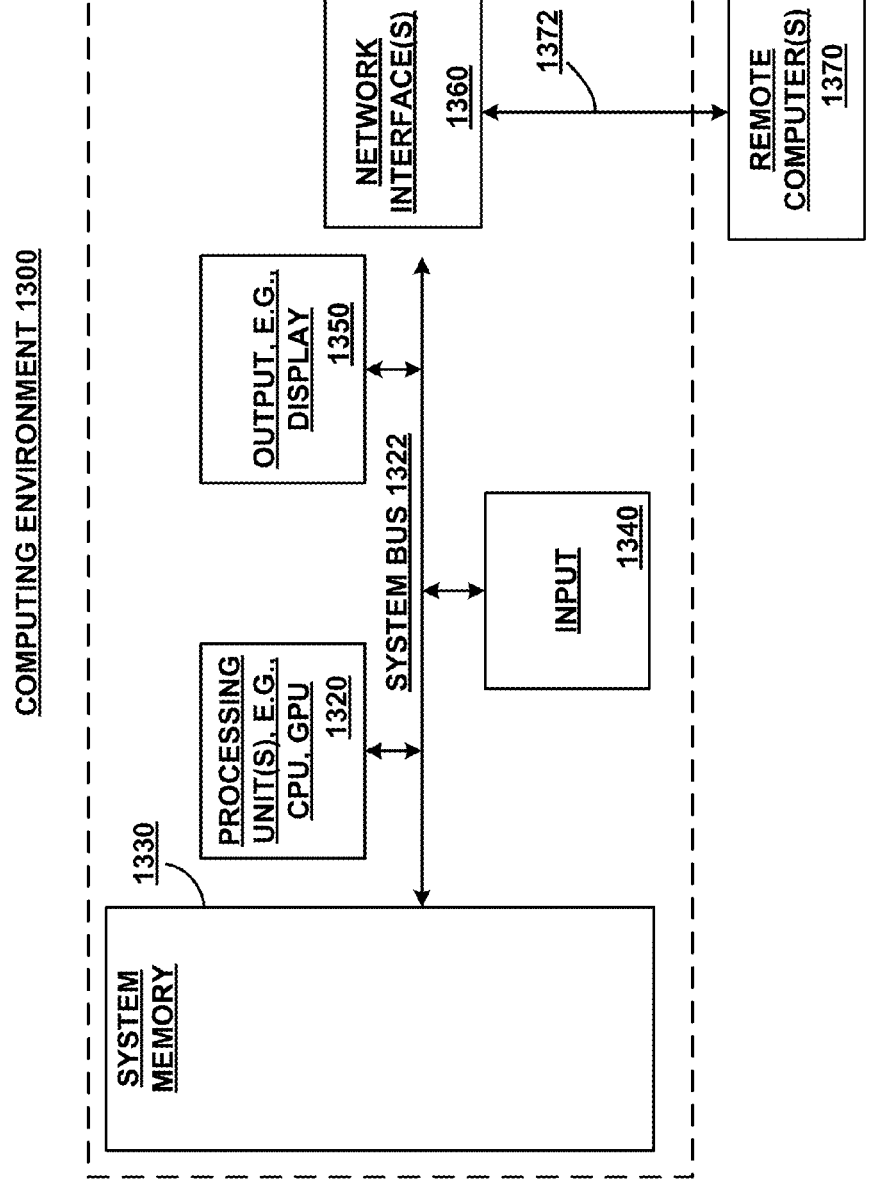
FIG. 13 is a block diagram representing an exemplary non-limiting computing system or operating environment in which the various embodiments may be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing environment 1300 be interpreted as having any dependency or requirement relating to any one or combination of components illustrated in the exemplary operating environment 1300.

With reference to FIG. 13, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320. It is to be appreciated that the computer 1310 can be used in connection with implementing one or more of the systems or components shown and described in connection with FIGS. 1-5.

Computer 1310 includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, memory 1330 may also include an operating system, application programs, other program modules, and program data.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
   a processor; and
   a memory communicatively coupled to the processor, the memory having stored therein computer-executable instructions, comprising:
      a reception component configured to receive a first video stream comprising an edited version of a video and a second video stream comprising an unedited version of the video, wherein the video comprises a plurality of frames and the first video stream comprises a plurality of edited frames of the video corresponding to the edited version of the video;
      a mask component configured to receive input identifying a masked region of a frame of the video and an unmasked region of the frame of the video;
      a composite component configured to:
         extract, from the first video stream, respective edited portions of edited frames of the plurality of edited frames corresponding to the masked region,
         extract, from the second video stream respective unedited portions of frames of the plurality of frames, corresponding to the edited frames, corresponding to the unmasked region, and
         combine, for the edited frames of the plurality of edited frames, the respective edited portions and the respective unedited portions without additional editing applied to the edited portions to generate a composite split-frame version of the video; and
      a playback component configured to display the composite split-frame version of the video via an interface.

2. The system of claim 1, wherein the input identifying the masked region of the frame of the video comprises selection of a region of the frame of the video to cover with a mask as the frame of the video is displayed via the interface.

3. The system of claim 2, wherein the input identifying the masked region of the frame of the video comprises selection of a size, a shape, and a location of the mask.

4. The system of claim 1, wherein the reception component is further configured to receive the first video stream and the second video stream such that corresponding frames of the video included in the edited version and the unedited version are received simultaneously.

5. The system of claim 4, wherein the reception component is further configured to receive a composite data stream comprising the first video stream and the second video stream.

6. The system of claim 1,
   wherein the mask component is further configured to receive additional input identifying a new masked region of a frame of the video and a new unmasked region of the frame of the video over the course of a playback of the composite split-frame version of the video; and
   wherein the composite component is configured to:
      extract, from the first video stream, respective new edited portions of the edited frames of the plurality of edited frames corresponding to the new masked region,
      extract, from the second video stream respective new unedited portions of the frames of the plurality of frames, corresponding to the edited frames, corresponding to the new unmasked region, and
      for the edited frames of the plurality of frames, combine the respective new edited portions and the respective new unedited portions to generate a new composite split-frame version of the video.

7. The system of claim 6, wherein the playback component is further configured to seamlessly switch the playback of the composite split-frame version of the video to the new composite split-frame version of the video.

8. The system of claim 1, further comprising:
an interface component configured to generate the interface, wherein the interface comprises a set of mask controls that facilitate drawing of a mask over the frame of the video to define the masked region.

9. A method, comprising:
receiving, by a system including a processor, a first video stream comprising an edited version of a video and a second video stream comprising an unedited version of the video, wherein the video comprises a plurality of frames and the first video stream comprises a plurality of edited frames of the video corresponding to the edited version of the video;
receiving, by the system, input identifying a masked region of a frame of the video and an unmasked region of the frame of the video;
extracting, by the system from the first video stream, respective edited portions of edited frames of the plurality of edited frames corresponding to the masked region;
extracting, by the system from the second video stream, respective unedited portions of the frames of the plurality of frames, corresponding to the edited frames, corresponding to the unmasked region;
combining, by the system for the edited frames of the plurality of edited frames, the respective edited portions and the respective unedited portions without additional editing applied to the edited portions to generate a composite split-frame version of the video; and
displaying, by the system, the composite split-frame version of the video via an interface.

10. The method of claim 9, wherein the receiving the input identifying the masked region of the frame of the video comprises receiving a selection of a region of the frame of the video to cover with a mask as the frame of the video is displayed via the interface.

11. The method of claim 10, wherein the receiving the input identifying the masked region of the frame of the video comprises receiving selection of a size, a shape, and a location of the mask.

12. The method of claim 9, wherein the receiving comprises receiving corresponding frames of the video included in the edited version and the unedited version simultaneously.

13. The method of claim 12, wherein the receiving comprises receiving a composite data stream comprising the first video stream and the second video stream.

14. The method of claim 9, further comprising:
receiving, by the system, additional input identifying a new masked region of a frame of the video and a new unmasked region of the frame of the video over the during a playback of the composite split-frame version of the video,
extracting, by the system from the first video stream, respective new edited portions of the edited frames of the plurality of edited frames corresponding to the new masked regions;
extracting, by the system from the second video stream, respective new unedited portions of the frames of the plurality of frames, corresponding to the edited frames, corresponding to the new unmasked region;
combining, by the system for the edited frames of the plurality of frames, the respective new edited portions and the respective new unedited portions to generate a new composite split-frame version of the video, and seamlessly switching, by the system, the playback of the composite split-frame version of the video to the new composite split-frame version of the video.

15. The method of claim 9, further comprising:
generating, by the system, an interface, wherein the interface comprises a set of mask controls that facilitate drawing of a mask over the frame of the video to define the masked region.

16. A non-transitory computer-readable medium having instructions stored thereon that, in response to execution, cause a system including a processor to perform operations, comprising:
receiving a first video stream comprising an edited version of a video and a second video stream comprising an unedited version of the video, wherein the video comprises a plurality of frames and the first video stream comprises a plurality of edited frames of the video corresponding to the edited version of the video;
receiving input identifying a masked region of a frame of the video and an unmasked region of the frame of the video;
extracting, from the first video stream, respective edited portions of edited frames of the plurality of edited frames corresponding to the masked region;
extracting, from the second video stream, respective unedited portions of the frames of the plurality of frames, corresponding to the edited frames, corresponding to the unmasked region;
combining, for the edited frames of the plurality of edited frames, the respective edited portions and the respective unedited portions without additional editing applied to the edited portions to generate a composite split-frame version of the video.

17. The non-transitory computer-readable medium of claim 16,
the operations further comprising displaying the composite split-frame version of the video via a graphical user interface.

18. The non-transitory computer-readable medium of claim 16, the operations further comprising:
receiving additional input identifying a new masked region of a frame of the video and a new unmasked region of the frame of the video during a playing of the composite split-frame version of the video;
extracting, from the first video stream, respective new edited portions of the edited frames of the plurality of edited frames corresponding to the new masked regions;
extracting, from the second video stream, respective new unedited portions of the frames of the plurality of frames, corresponding to the edited frames, corresponding to the new unmasked region;
combining, for the edited frames of the plurality of frames, the respective new edited portions and the respective new unedited portions to generate a new composite split-frame version of the video.

19. The non-transitory computer-readable medium of claim 18, the operations further comprising:
seamlessly switching the playing of the composite split-frame version of the video to the new composite split-frame version of the video.

20. The non-transitory computer-readable medium of claim 16, the operations further comprising:
generating a graphical user interface that includes an editing window wherein the split-frame version of the composite video is displayed and comprising a set of mask adjustment controls that enable selection of a location and a shape of a mask formed over image data of the frame of the video, wherein the mask defines the masked region.

21. The non-transitory computer-readable medium of claim 16, wherein the receiving comprises receiving corresponding frames of the video included in the edited version and the unedited version simultaneously.

22. The non-transitory computer-readable medium of claim 16, wherein the receiving the input identifying the masked region of the frame of the video comprises receiving selection of a size, a shape, and a location of the mask.

* * * * *